Patented Sept. 13, 1927.

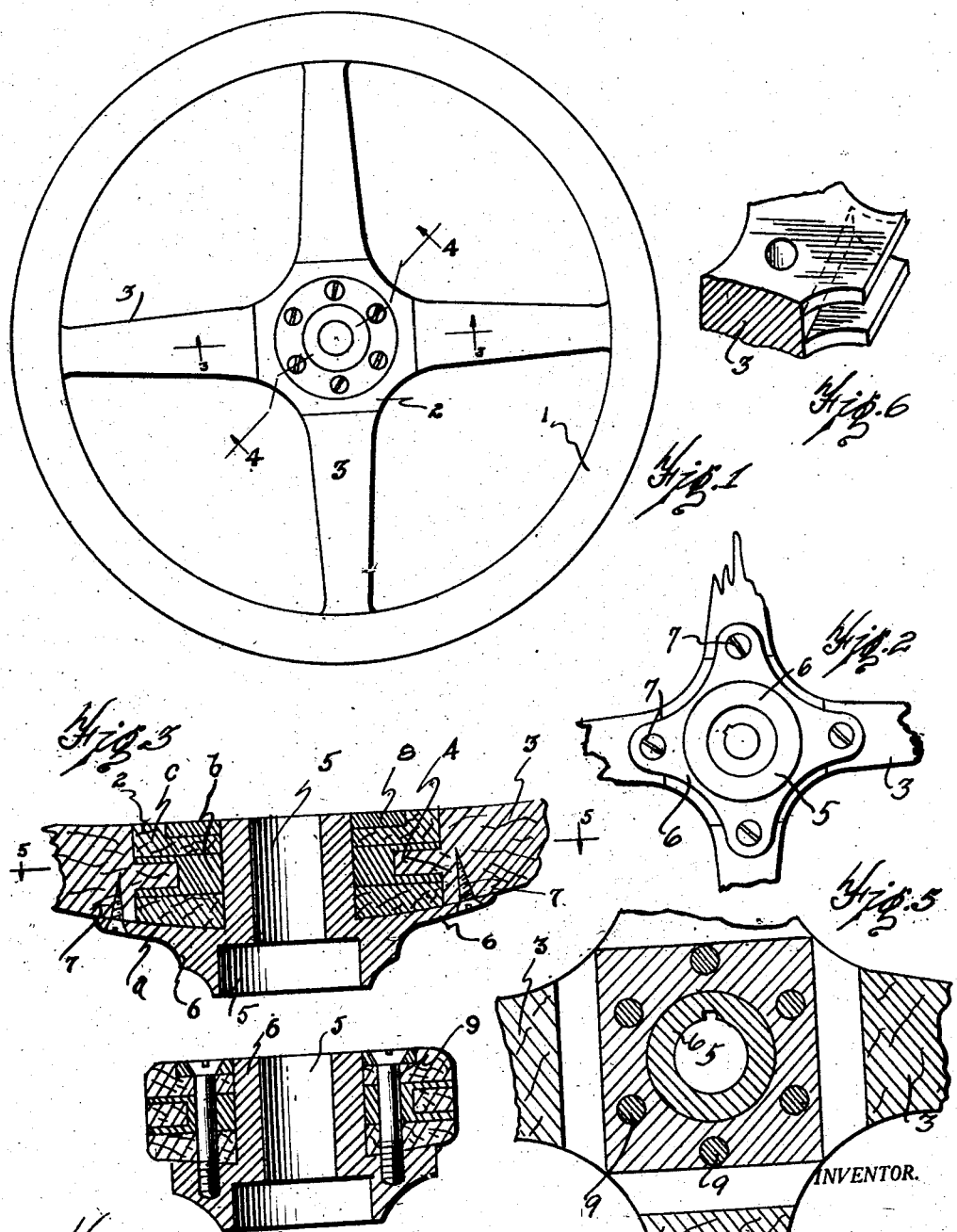

1,642,029

UNITED STATES PATENT OFFICE.

ADOLPH G. JONES, OF CELERON, NEW YORK, ASSIGNOR, BY MESNE ASSIGNMENTS, TO THE LOBDELL-EMERY MFG. CO., OF ALMA, MICHIGAN, A CORPORATION OF MICHIGAN.

WOOD-SPOKED STEERING WHEEL.

Application filed November 12, 1923, Serial No. 674,166. Renewed January 25, 1927.

This invention relates to wood spoked wheels particularly steering wheels for use in automobiles, airplanes, etc., and the object is to secure a wood-spoked, woodrimmed, wheel of great strength and neat appearance that can be finished in conformity to the interior finish of the automobile or other structure. Steering wheels and similar hand wheels have heretofore been made with wooden spokes but are lacking in strength particularly at the hub at which point the spokes are usually of greater width than the body of the spoke. Being made of straight grained wood, these ends have a tendency to split by twisting strain to which the rim may be subjected. This invention seeks to overcome such defect by providing a wooden hub to which the spokes are connected thereby securing greater strength at the center. A further object of the invention is to provide a metal hub to which the wood hub is secured, the said metal hub being designed to strengthen the wood structure at the hub preventing fracture thereof. The principal feature of the invention is in the wood hub which is preferably formed of a plurality of parts lying in cross grained relation and to which the inner ends of the spokes are connected. These general objects and the several novel features of construction of a wood spoked wheel are hereinafter more fully described and claimed, and the preferred construction of wheel embodying my invention is shown in the accompanying drawings in which—

Fig. 1 is a plan view of my improved wood spoked wheel.

Fig. 2 is a view from the bottom side showing the assembled wood and metal hubs.

Fig. 3 is a section taken on line 3—3 of Fig. 1 through the hub.

Fig. 4 is a section taken on line 4—4 of Fig. 1.

Fig. 5 is a section taken on line 5—5 of Fig. 3.

Fig. 6 is a detail in perspective of a part of the wood hub showing the recess for the spoke ends.

My improved wheel consists of a rim 1 preferably of wood having four spokes in the type of wheel shown, the outer ends of which may be secured to the rim in any approved or well known manner usually being insertible in a recess formed in the rim. The spider consists of the wooden hub indicated generally at 2 and the spokes 3—3 etc. The hub is preferably made up of three parts $a$, $b$ and $c$ with the grain of the adjacent parts running in different directions, the several parts being glued together and clamped as hereinafter described. The hub member 2 may be made from long strips with the parts glued together and then cut into rectangular pieces of the desired size. The strips are cut into parts of substantially equal sizes, rectangular in form, and the central member $b$ is then grooved on each side as will be understood from Figs. 3 and 6 to receive the tongue 4 of a spoke 3 and preferably the grain of the center block $b$ is diagonal to that of the spoke end. The spoke ends are each provided with a tongue set into the groove on each one side of the central wooden hub and the spoke ends at the base of the tongue are of the same thickness as the hub abutting thereagainst and the inner end of each tongue abutting against the bottom of the groove with the spokes held in place by the rim. The tongued ends of the spokes are glued in place. As the spokes are secured to the wooden hub, the spokes and hub may be finished to the general form shown in Fig. 1. It is practically impossible by any ordinary strain to which the wheel may be subjected in use to split the inner ends of the spokes from the hub. This wooden hub 2 is centrally apertured to receive a metal hub 5 which has a central aperture counterbored at the lower end 6 to fit the steering shaft which may be shaped in any desired manner to permit the wheel to be secured to the shaft or like member which it is desired to turn. In any case this hub 5 is provided with a flange and arms 6 on the lower side extending beyond the joint between each spoke 3 and the wooden hub 2, as will be understood from Fig. 3. Screws 7 are utilized to secure the arms 6 to the wood spoke 3 and this metal arm overlapping the joint between the wooden hub and the spoke greatly strengthens the spider enabling it to withstand excessive strains.

In a wood hub made up of laminations there is a tendency for the laminations to part and to eliminate such undesirable condition, the several parts of the wood hub are bound together by means of a ring 8 set into an annular recess in the upper member $c$ of the hub and screws 9 are insertible through the ring and the several wooden-hub parts and threaded into the lower flange of the metal hub. As previously stated, these tongues 4 are glued in place in the central grooved member 5 of the wooden hub structure. The spoke at the base of the tongue is of the same thickness as the hub thus providing shoulders abutting the side of the hub. By the arrangement rotative strains to which the wooden hub is subjected are resisted and strength is secured by the attachment of the arm 6 to the spokes at a point beyond the tongue. These metal arms also resist strains parallel to the shaft to which the wheel is attached. The metal hub 5 and integral arms 6 are preferably made of aluminum or an aluminum alloy for the purpose of securing lightness and the arrangement provides a wheel that is light in weight, comparatively inexpensive in construction and of great strength particularly at the hub which heretofore has been the weakest part of a wooden spoked steering wheel. Liability of the laminations of the hub separating or spoke end splitting is also practically eliminated as the grain of the wood forming the spokes is practically straight with the spoke which is nested into a wood hub member of several parts clamped together and of a character adapted to withstand twisting strains and prevent splitting.

By the structure herein described I secure a solid spoke which is greatly to be desired in this type of wheel as the laminated spokes are very liable to separate between surfaces. I therefore avoid the troubles incident to the use of a laminated wheel spoke and secure the same neatness of appearance as with the usual wood spoked wheel, and it is also to be understood (although not here shown) that these spokes may have any desired shape in cross section and are more or less curved extending at an angle to the plane of the rim as in the ordinary steering or hand wheel having a metal spider.

Having thus fully described my invention, its utility and mode of operation, what I claim and desire to secure by Letters Patent of the United States is—

1. A steering wheel comprising a wooden rim, four wooden spokes of materially greater width than thickness secured to the rim at the outer ends and extending inwardly on radial lines at an angle to the plane of the rim, each spoke having a tongue at the inner end less in thickness and greater in width than the body of the spoke, a centrally apertured wooden hub having grooves to receive the tongues, the spoke ends at the point of junction of the tongues therewith abutting the wooden hub, and a metal hub secured in the aperture of the wooden hub and having radial arms each extending outwardly along one side of and attached to a spoke beyond the junction thereof with the wooden hub.

2. A steering wheel comprising a rim, a wooden hub portion having a central aperture and a peripheral groove intermediate the side surfaces thereof, four wooden spokes having the outer ends secured to the rim and the inner ends provided with tongues engaging in the groove of the wooden hub, the ends of the spokes being of a thickness equal to that of the hub, a metallic hub insertible in the aperture of the wooden hub and adapted for attachment to a shaft or the like, the said metal hub having radial arms each extending outwardly and attached to the under surface of a spoke beyond the wooden hub, a clamping ring in the opposite side of the metal hub adapted to fit over the sleeve end, and bolts extending between the ring and the opposite end of the metal hub.

3. A steering wheel comprising a wooden rim, a plurality of wooden spokes secured to the rim at the outer ends, a wooden hub portion having a groove to receive the inner ends of the spokes, said wooden hub having a central opening, a metal sleeve insertible therein having a flange and arms on one side each extending outwardly of and in contact with the under side of a spoke, means for fastening the arms to the respective spokes beyond the wooden hub portion, a ring fitting over the sleeve on the opposite end, and means for moving the ring member to clamp the hub between the ring and sleeve flange.

4. A steering wheel comprising a wooden rim, a plurality of wooden spokes secured to the rim at the outer ends, the inner ends thereof being provided with a tongue, a centrally apertured wooden hub member having an annular recess to receive the tongues, a sleeve insertible in the hub aperture and having a flange and arms at one end attached to a spoke, a ring fitting over the opposite end of the sleeve, and bolts extending through the ring and wooden hub portion and threaded in the flange of the sleeve.

5. A steering wheel comprising a wooden rim, four wooden spokes of greater width than thickness entering and secured to the rim at the outer ends extending inwardly on radial lines, each spoke having a tongue of less thickness at the inner end, a wooden hub having a marginal groove to receive the tongues and a central opening, a metal hub insertible therein and adapted for attachment to a shaft, a series of lugs on the metal hub each extending radially along the under side of a spoke and attached thereto beyond the point of its junction with the hub and means for clamping the wooden hub and metal hub together.

6. A steering wheel comprising a wooden rim, four wooden spokes of materially greater width than thickness entering and secured to the rim at the outer ends and extending inwardly on radial lines at an angle to the plane of the rim, each spoke having a tongue at the inner end of less thickness than the body of the spoke, a wooden hub of a thickness equal to the thickness of the spoke at the point of junction of the tongue therewith and having a central marginal groove to receive the tongue, said tongues being laterally enlarged with the side surfaces of adjacent tongues in abutting relation and means adapted to secure the wheel to a steering post.

7. A steering wheel comprising a rim, a wooden hub portion having a central aperture and a marginal groove intermediate the side surfaces thereof, said wooden hub being formed of several similar pieces secured together with the grain of the adjacent pieces running in different directions, radial wooden spokes having the outer ends secured to the rim and the inner ends formed with tongues engaged in the groove of the hub, the thickness of the spoke at the junction of the tongue therewith being equal to the thickness of the hub with which it lies in abutting relation, a metallic member secured to the wood hub having arms each lying against a spoke on one side and attached thereto beyond the point of abutment with the wooden hub.

8. A steering wheel comprising a rim, a series of wooden spokes having the outer ends thereof attached to the rim and the inner ends formed to provide tongues, a wooden hub adapted to receive the tongues and having a central aperture, a metal hub secured to the wooden hub and having arms each lying in contact with a spoke and extending beyond the point of junction thereof with the wooden hub, and means for fastening the hubs together.

9. A steering wheel comprising a wooden rim of rounded section, four wooden spokes having the outer ends thereof insertible in and attached to the rim, a centrally apertured wooden hub member formed of several plies of wood, the grain of adjacent pieces running in different directions, the spokes at the inner ends being adapted for attachment to the wooden hub and having parts abutting thereagainst, a metal hub provided with a sleeve extending through the wooden hub and having on one end four arms each lying against the side of a spoke with the outer end attached thereto beyond the wooden hub, and a clamping member for clamping and maintaining the several parts together.

10. A steering wheel comprising a wooden rim of rounded cross section, four wooden spokes having the outer ends attached to and extending on radial lines with the inner ends formed to provide laterally enlarged tongues of less thickness than the spokes, a centrally apertured wooden hub formed of three similar members, the central member being grooved to receive the tongues, a metal sleeve insertible in the aperture of the wooden hub and having a flange on one end, a ring fitting about the sleeve at the opposite end and set into the hub flush with the surface thereof and of the sleeve end, bolts extending through the ring and hub and threaded in the flange of the sleeve binding the several parts together.

11. A steering wheel comprising a wooden rim member, a series of four radial spokes of wood having outer ends entering and secured to the rim and extending at an angle to the plane of the rim, the said inner ends having tongues of less thickness than the body of the spoke at said end, the tongues being laterally enlarged with the side surfaces of adjacent tongues in abutting relation, a centrally apertured wooden hub grooved to receive the tongues, the grain of the wood at the hub lying at an angle to the grain of the tongues, a metal hub having a portion extending through the aperture of the wooden hub, a loose ring fitting the end of the sleeve and bolts extending through the ring and hub and engaging the opposite end of the sleeve binding the parts together.

12. A steering wheel comprising a wooden rim, four radial spokes of wood having the outer ends secured to the rim, a wooden hub to which the inner ends of the spokes are secured, the wooden hub having a central opening, a metal hub having a part insertible in the opening of the hub and arms at one end each lying along a spoke and having the outer ends secured thereto beyond the point of engagement with the hub, and means including bolts for securing the hubs together.

13. A steering wheel comprising a wooden rim, a series of solid wooden spokes having the outer ends attached to the rim, a centrally apertured wooden hub to which the inner ends thereof are attached, the thickness of the spoke being equal to that of the hub at the point of junction therewith, a clamping device including a sleeve provided with radial arms on one end each lying in contact with the under surface of a spoke and attached thereto beyond the point of junction with the hub, a ring member fitting over the opposite end of the sleeve and movable to clamp the wooden hub between the arms and the ring.

14. A steering wheel comprising a rim, a plurality of wooden spokes radially arranged and secured to the rim at the outer end, a wooden hub portion having a marginal groove, the inner ends of the spokes being provided with tongues insertible in the groove, the tongues being laterally enlarged with the side surface of adjacent tongues in abutting relation the spoke ends at the base of the tongue abutting the hub, the hub and said abutting spoke ends being practically of the same thickness, and a metal member for securing the hub to a shaft.

15. A steering wheel comprising a wooden rim, four wooden spokes of greater width than thickness secured to the rim at the inner end less than the thickness of the spoke at the base of the tongue, a wooden hub having a central marginal groove to receive the tongues, said hub being of the same thickness as the spoke at the base of the tongue and having a central opening, a metal hub insertible in the said central opening having arms on one end each lying in contact with a spoke and attached thereto beyond the base of the tongue, and clamping means co-operating with the metal hub to clamp the several parts together.

16. In a hand wheel, a wooden rim, a wooden hub formed of several plies with the grain running in different directions and having a peripheral groove and a central aperture, a plurality of radial spokes having the outer ends secured to the rim and the inner ends provided with tongues whose ends seat against the bottom of the groove, the spokes at the base of the tongue being equal in thickness to the thickness of the hub, and a metal hub insertible in the wooden hub, and parts co-operating therewith to bind the several members together.

17. A steering wheel comprising a wooden rim of rounded cross section, a series of solid wooden spokes radially arranged and having the outer ends insertible in and attached to the rim, the inner ends of the spokes each having a tongue less in thickness than the thickness of the spoke and laterally enlarged, the side surfaces of the adjacent tongues being in abutting relation a centrally apertured wooden hub having a groove to receive the tongues, the hub being of a thickness equal to the spoke ends at the base of the tongues, and a metal hub insertible in the wooden hub and having a flange at one end, a loose ring fitting over the opposite end, and bolts extending between the ring and flange and through the hub binding the several parts together.

18. A steering wheel comprising a wooden rim of rounding cross section, a series of solid wooden spokes radially arranged and having the outer ends attached to the rim, a centrally apertured wooden hub formed of three plies of wood, the central ply being provided with a peripheral groove and the inner ends of the spokes having tongues insertible in the groove, the thickness of a spoke at the base of the tongue being equal to the thickness of and abutting the hub, and a metal hub secured in the central aperture of the wooden hub adapted for attachment to a shaft.

19. A steering wheel comprising a wooden rim, four wooden spokes having the outer ends entering and secured to the rim, a centrally apertured wooden hub having a peripheral groove, the inner ends of the spokes having laterally enlarged tongues insertible in the groove, the side edges of the tongues of adjacent spokes lying in abutting relation and a metal hub secured in the aperture of the wooden hub.

20. A steering wheel comprising a wooden rim, wooden spokes having the outer ends secured to the rim, a centrally apertured wooden hub having a groove in its periphery, the inner ends of the spokes being formed with tongues of less thickness than the spoke, the said tongue ends abutting the bottom of the groove and the shoulders at the point of junction of the tongue with the spoke abutting the hub periphery, and a metal hub secured in the aperture of the wooden hub.

21. A steering wheel comprising a wooden rim, a plurality of wooden spokes of greater width than thickness secured to the rim at their outer ends, said spokes having reduced inner end portions extending into a hub and shoulders bearing against the hub, in combination with a hub member having recesses to receive the reduced ends of the spokes and a second hub member having arms extending radially under the spokes and connected directly thereto.

In testimony whereof, I sign this specification.

ADOLPH G. JONES.